Oct. 11, 1960    L. L. WHEELER ET AL    2,955,356
BOMBSIGHT
Filed June 8, 1944    5 Sheets-Sheet 1

INVENTOR
L. L. WHEELER
R. F. GARBARINI
BY
ATTORNEY.

Oct. 11, 1960  L. L. WHEELER ET AL  2,955,356
BOMBSIGHT
Filed June 8, 1944  5 Sheets-Sheet 3

INVENTOR
L. L. WHEELER
R. F. GARBARINI
BY
ATTORNEY.

INVENTOR
L.L. WHEELER
R.F. GARBARINI
BY
ATTORNEY.

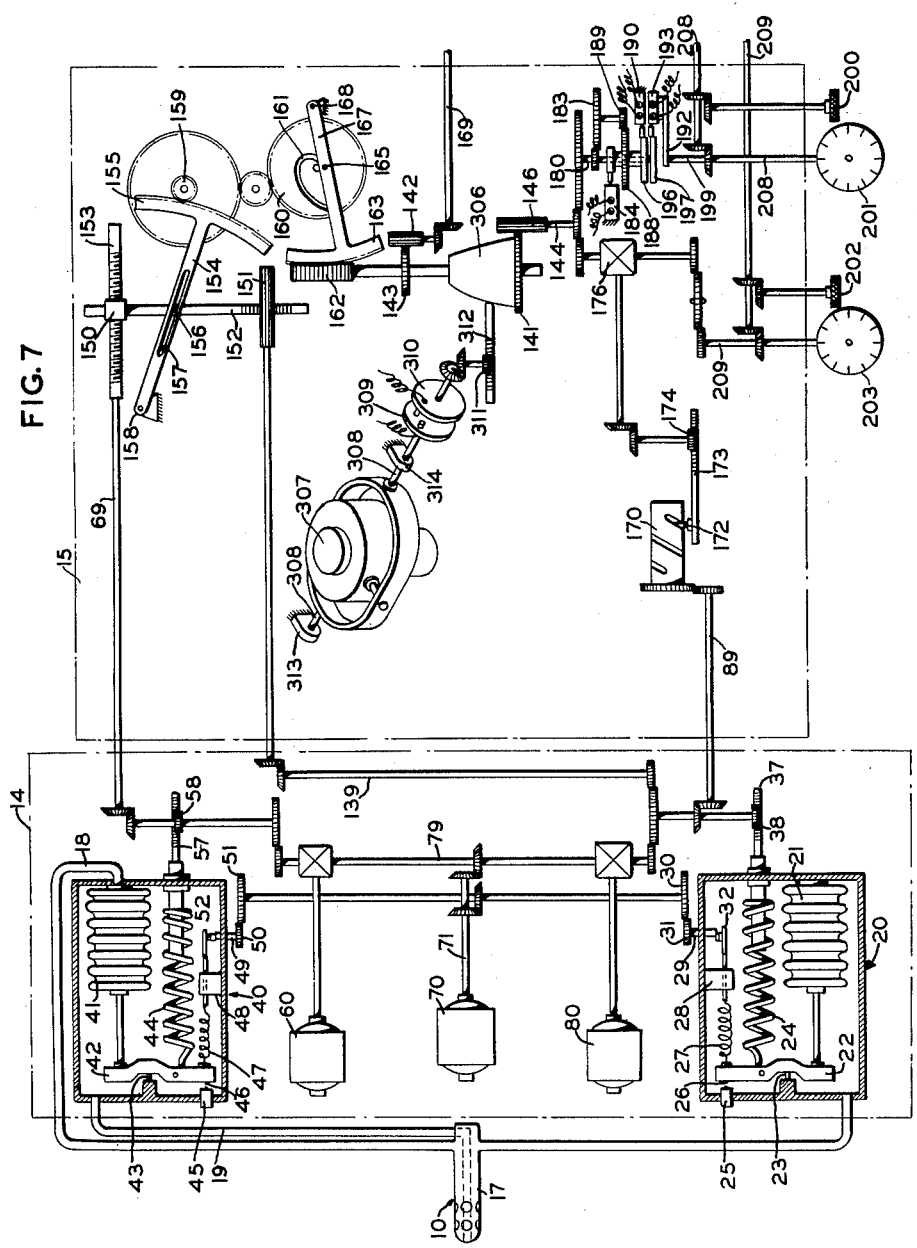

United States Patent Office 2,955,356
Patented Oct. 11, 1960

2,955,356

BOMBSIGHT

Lisle L. Wheeler, Garden City, and Robert F. Garbarini, Woodside, N.Y., assignors to Sperry Rand Corporation, a corporation of Delaware Filed June 8, 1944, Ser. No. 539,366

9 Claims. (Cl. 33—46.5)

This invention relates to an apparatus for bombing from aircraft. The apparatus is particularly adapted for use in a bomb-release system of an aircraft, especially the bomb-release system of a pursuit bomber where the bomb is released during a diving maneuver of the aircraft having a bombsight defining a line of sight depressed below the thrust axis of the aircraft.

In accordance with one of the methods heretofore used, the pilot of the pursuit bomber is required to begin his bombing run by horizontal flight, at a known altitude, and at a distance sufficiently remote from the target, to enable him to pick up the target in the sight from his horizontal path, to maintain a constant speed along the flight path at a predetermined speed value, and to release the bomb manually when the pilot observes that the altitude of his airplane above the target, as shown by his altimeter, is equal to that measure of altitude which has been calculated from the previously determined value of air speed and altitude of initial horizontal approach. If the pilot fails to observe these restrictions he cannot compute the correct point of bomb release. Such a procedure imposes an undue burden upon the pilot. Furthermore, the release altitude computed from the predetermined values of constant air speed and initial tracking altitude, is to a certain extent erroneous, because the altitude of release is computed for a zero value of the angle of attack, whereas generally speaking, during the dive, the angle of attack will vary. Besides, in addition to these restrictions upon the pilot's activities, during the bombing run, the pilot is restricted to a comparatively small angle of dive and to a comparatively low altitude for initiating the dive.

One object of this invention is to relieve the pilot of the necessity of determining when to release the bomb.

Another object is to compute the correct point of bomb release from the airplane while the pilot is diving at the target, and to release the bomb automatically at the correct point in the dive.

Another object it to enable the pilot to track the target at any speed within the range of the airplane.

Another object is to increase the altitude range of the aircraft for initiating the bombing run.

Another object is to dispense with the necessity of starting the dive from horizontal flight at a specified altitude.

Another object is to automatically compute the correct instant for releasing the bomb as determined by the altitude, air speed, and diving angle of the plane.

Another object is to shorten the approach time when making a bombing run.

Another object is to eliminate need of horizontal flight before picking up the target.

Another object is to eliminate the necessity of diving at a constant rate of speed.

Other objects will appear from the detailed description.

In accordance with this invention while the airplane is diving toward the target, its speed, and its altitude above the target are used to continuously and automatically compute the correct diving angle for releasing the bomb under the particular set of flight conditions then in effect, and when the actual diving angle of the aircraft becomes equal to the computed diving angle, a condition is established to automatically release the bomb, and a signal is given to the pilot indicating that the bomb run is completed.

One form of the invention includes a computer that is controlled by static and dynamic pressure-responsive devices for continuously positioning one bomb-release contact according to the diving angle at which the plane must be disposed for a bomb to strike the target. At the same time, another bomb-release contact is continuously positioned according to the actual diving angle of the plane. When the two contacts coincide, they complete a circuit which operates the bomb-releasing mechanism.

However, this form of the invention is subject to certain limitations due to the fact that some pendulous device, such as a gyro vertical, must be used to measure the actual diving angle of the aircraft. As is well known, accelerations of the aircraft tend to displace such devices from the true vertical direction, and erection mechanisms must be employed to return them to the true vertical. After maneuvering the aircraft, it is necessary to fly a steady course for an appreciable length of time to permit operation of the erection mechanism before the correct measure of the diving angle of the airplane is obtained. For this reason the computer does not operate the bomb-release mechanism accurately until the necesary time interval has elapsed.

In order to avoid the necessity for delaying the release of the bomb after maneuvering the aircraft, it is preferable to use other measurable conditions that depend upon the diving angle of the aircraft. It has been found that for any given air speed the diving angle depends upon a function of the rate of change of altitude. This may be proven trigonometrically, as will subsequently appear.

Since the correct diving angle for releasing the bomb depends upon air speed and altitude, it is possible, by the apparatus hereinafter described, to compute the correct altitude rate for releasing the bomb for any particular speed. The computed altitude rate and air speed then correspond to the correct diving angle for releasing the bomb. In this manner, instead of computing the correct diving angle for releasing the bomb, the correct rate of change of altitude for releasing the bomb is computed from the air speed and altitude of the aircraft. Since the diving angle depends upon the rate of change of altitude as well as the air speed, computation of the altitude rate effects the same result as computation of the diving angle for releasing the bomb.

Thus, in the preferred form of the invention, one bomb-release contact is positioned according to the computed rate of change of altitude at which the aircraft must be diving in order for a bomb released therefrom to strike the sighted target, as determined by the actual altitude and air speed of the aircraft. To position the other contact, an improved apparatus is provided for continuously measuring the rate of change of altitude of the aircraft. In this apparatus, the static pressure operates a differentiating mechanism to provide computing apparatus with measures of static pressure as well as the rate of change of static pressure. This computing apparatus may be adjusted according to the temperature, so it provides an accurate measure of the rate of change of altitude at which the aircraft is diving.

When the two contacts are positioned at the same rate of change of altitude, the bomb-release mechanism is actuated to initiate release of the bomb.

Each computer is designed for a specific type of plane, having its own angle of attack characteristics, and for a class of bombs having substantially the same ballistic coefficient. The computer, however, is so constructed that by replacing one of the cams by another cam having different lift values, the computer can then be used in an airplane having any other angle of attack characteristics, and with classes of bombs having any other ballistic coefficient. The computer automatically compensates for the angle of attack, something which the pilot could not possibly do mentally.

In the drawings comprising five sheets, of seven figures, numbered Figs. 1 to 7, both inclusive, certain embodiments of the invention are set forth.

Fig. 7 is a diagram of a modified form of computer and associated servo-mechanism.

Like reference characters designate corresponding parts throughout the several figures of the drawings.

Figure 2:
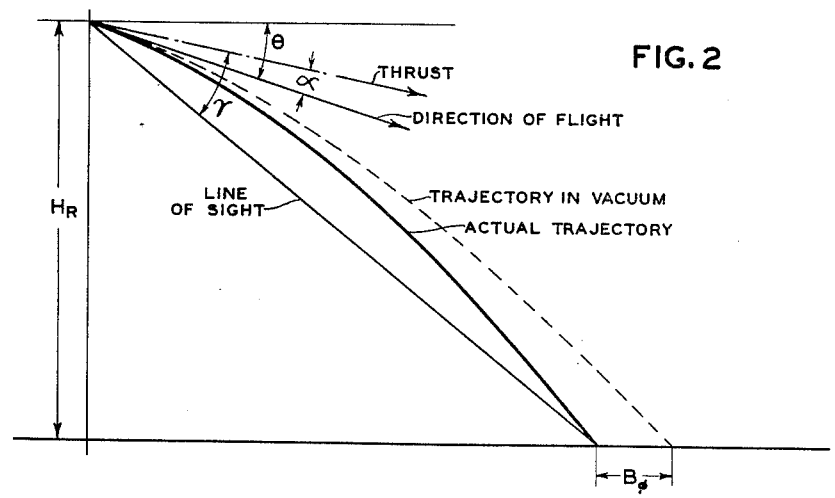
Fig. 2 is a diagram showing certain geometric elements which are involved and which must necessarily be considered in practicing the invention.
Figure 3:
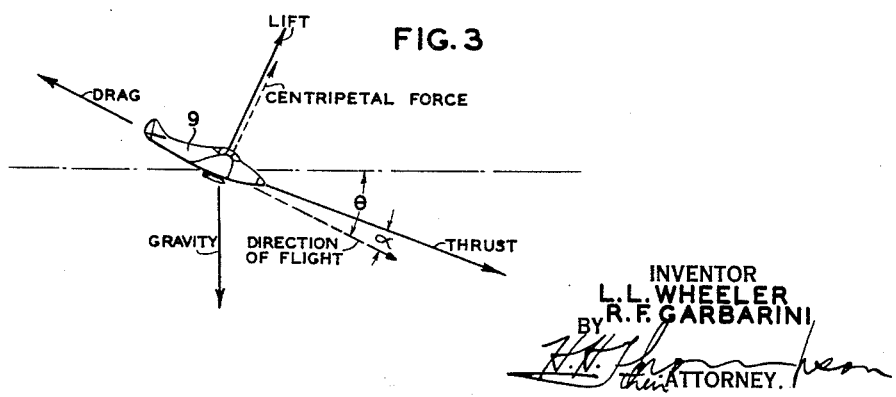
Fig. 3 is a vectorial diagram of the forces acting upon an airplane when dive-bombing a target.

Referring first to Fig. 2, and to facilitate understanding of the basic theory underlying the computer, certain assumptions will be made tentatively; this will permit simpler expression of the mathematical relations involved. In the final analysis, these assumptions will be removed, and the theory made applicable to the true problem. These tentative assumptions (see Fig. 2), are as follows:

(a) The angle of attack ($\alpha$), corresponding to the angle between the direction of flight of the aircraft and its thrust axis, is equal to zero.

(b) The speed of the target ($V_T$) and wind velocity ($V_W$) at the target are zero.

(c) The trajectory is that of a bomb falling in a vacuum, which eliminates the effect of air resistance from the equations. Hence the range lag ($B_\phi$) of the bomb is equal to zero.

The release altitude ($H_R$) for a bomb falling in a vacuum is given by the following equation:

$$H_R = \frac{2V^2}{g} \cos^2 \theta \tan^2 (\theta+\gamma) \left\{ 1 - \frac{\tan \theta}{\tan (\theta+\gamma)} \right\} \quad (1)$$

Equation 1 can be derived by the use of Fig. 2. It applied only when the line of sight is depressed below the thrust axis of the aircraft through an angle of depression ($\gamma$). If the acceleration due to gravity ($g$) is considered constant, Equation 1 shows that the altitude for release ($H_R$) is a function of the true air speed ($V$) and the dive angle ($\theta$). This or an equivalent equation can be solved mechanically by a bomb-release computer. Such a computer requires: (a) mechanism to continuously provide the altitude of the aircraft above the target, (b) mechanism to provide the true air speed of the aircraft, and (c) mechanism to provide a measure of the dive angle ($\theta$). If desired, the dive angle ($\theta$) may be replaced by the measurable variable time rate of change of actual altitude ($\dot{H}$) which is related to the dive angle ($\theta$) in the manner indicated by the equation:

$$\sin \theta = \frac{\dot{H}}{V} \quad (2)$$

or $$\theta = \sin^{-1} \frac{\dot{H}}{V} \quad (3)$$

From Equation 3, the following equations may be derived:

$$\cos \theta = \cos \left( \sin^{-1} \frac{\dot{H}}{V} \right) \quad (4)$$

$$\tan \theta = \tan \left( \sin^{-1} \frac{\dot{H}}{V} \right) \quad (5)$$

$$\tan (\theta+\gamma) = \tan \left\{ \left( \sin^{-1} \frac{\dot{H}}{V} \right) + \gamma \right\} \quad (6)$$

By substituting Equations 4, 5 and 6 in Equation 1 we obtain:

$$H_R = \frac{2V^2}{g} \cos^2 \left[ \sin^{-1} \left( \frac{\dot{H}}{V} \right) \right] \tan^2 \left\{ \left( \sin^{-1} \left( \frac{\dot{H}}{V} \right) \right) + \gamma \right\} \left\{ 1 - \frac{\tan \left[ \sin^{-1} \left( \frac{\dot{H}}{V} \right) \right]}{\tan \left[ \left( \sin^{-1} \left( \frac{\dot{H}}{V} \right) \right) + \gamma \right]} \right\} \quad (7)$$

Equation 7 discloses that the release altitude ($H_R$) is a function of true air speed ($V$) and actual altitude rate ($\dot{H}$). It can likewise be said, that the time rate of change ($\dot{H}_R$) of the release altitude ($H_R$) is a function of the actual altitude ($H$) and the true air speed ($V$), since from Equation 7 the release altitude rate ($\dot{H}_R$) can, theoretically at least, be expressed in terms of actual altitude ($H$) and true air speed ($V$), where the release altitude rate ($\dot{H}_R$) is that rate of change of altitude at which the aircraft should descend when it has a true air speed ($V$) to be diving at the correct angle for releasing the bomb as determined by its true air speed ($V$) and its altitude. From this relation, it is apparent that the correct altitude rate ($\dot{H}_R$) for releasing the bomb is a function of the altitude ($H$) and air speed ($V$) of the aircraft. This may be written as:

$$\dot{H}_R = f(H, V) \quad (8)$$

In Equation 8 the angle of attack ($\alpha$), and the range lag ($B_\phi$) are assumed to equal zero. The function expressed by Equation 8 can be recorded upon a three dimensional cam which may be rotated in actual altitude ($H$), and translated in true air speed ($V$), thus giving a lift to the cam follower which is proportional to release altitude rate ($\dot{H}_R$). When this lift matches the actual altitude rate ($\dot{H}$) of the airplane, the bomb-release circuit is closed to release the bomb from its shackle. Since the three dimensional cam requires a measure of true air speed ($V$), and of actual altitude ($H$), and since a measure of actual altitude rate ($\dot{H}$) is required to match the lift of the follower of the three dimensional cam at release, special devices must be employed to compute these variables from other quantities which are more readily obtainable.

The equation for the actual altitude ($H$) of an airplane above the target is:

$$H = 221.151 T_{MA} (\log_{10} P_T - \log_{10} P_S) \quad (9)$$

wherein:

$T_{MA}$ is the mean atmospheric temperature between the airplane and the target.

$P_T$ is the static air pressure at the target, which in the majority of cases is at ground level or sea level.

$P_S$ is the static air pressure at the airplane. If an exact value of actual altitude (H) is to be obtained, the varying values of mean temperature ($T_{MA}$) and static pressure ($P_S$) must be continuously set into the altitude computing mechanism.

The equation for altitude rate is:

$$\dot{H} = \frac{R}{g} \cdot T \cdot \frac{\dot{P}_S}{P_S} \tag{10}$$

R is the gas constant for air.
g is the acceleration due to gravity.
T is the temperature of the atmosphere at the airplane.
$\dot{P}_S$ is the time rate of change of static pressure.

The true air speed of an airplane may be determined by the following equation:

$$V^2 = 7RT\left\{\left(1 + \frac{P_D}{P_S}\right)^{\frac{1}{3.5}} - 1\right\} \tag{11}$$

wherein:

$P_S$ is the static pressure at the airplane.
$P_D$ is the dynamic pressure at the airplane, being the difference between the total pressure measured along the thrust line and the static pressure.

It is possible to modify these equations so as to reduce the variables in each, without a loss of accuracy in the over-all solution In its modified form Equation 9 becomes:

$$H_M = 221.151 T_{CMA}(\log_{10} P_T - \log_{10} P_S) \tag{9A}$$

wherein:

$H_M$ is the modified altitude of the airplane.
$T_{CMA}$ is a constant mean atmospheric temperature, chosen to give an accurate solution.

In its modified form Equation 10 becomes:

$$\dot{H}_M = \frac{R}{g}\sqrt{T_C}\sqrt{T}\left\{\frac{\dot{P}_S}{P_S}\right\} \tag{10A}$$

$T_C$ is a constant temperature considered as the temperature at the airplane for purposes of calculation.

In its modified form Equation 11 becomes $$V_M^2 = 7RT_C\left\{\left[1 + \frac{P_D}{P_S}\right]^{\frac{1}{3.5}} - 1\right\} \tag{11A}$$

The result of these modifications is that simpler mechanisms can be employed to solve Equations 9A, 10A and 11A, than could be employed to solve Equations 9, 10 and 11.

In its modified form Equation 7 can be written thus:

$$\dot{H}_{MR} = \frac{2V_M^2}{g}\cos^2\left\{\sin^{-1}\left(\frac{\dot{H}_M}{V_M}\right)\right\}\tan^2\left\{\left(\sin^{-1}\frac{\dot{H}_M}{V_M}\right) + \gamma\right\}\left\{1 - \frac{\tan\left[\sin^{-1}\left(\frac{\dot{H}_M}{V_M}\right)\right]}{\tan\left[\left(\sin^{-1}\frac{\dot{H}_M}{V_M}\right) + \gamma\right]}\right\} \tag{7A}$$

Equation 7A can be written in the following functional form:

$$\dot{H}_{MR} = f(H_M, V_M) \tag{8A}$$

which shows that the modified release altitude rate ($\dot{H}_{MR}$) is a function of the modified altitude ($H_M$) and the modified air speed ($V_M$).

Since Equations 8 and 8A do not include the effect of angle of attack, and the range lag due to air resistance, a computer based on Equations 8 and 8A would be inaccurate. When angle of attack ($\alpha$) and range lag ($B_\phi$) are considered, the release equation becomes:

$$H_R = \frac{g}{2V^2\cos^2\theta}\{H_R \cot(\theta + \gamma - \alpha) + B_\phi\}^2 + \{H_R \cot(\theta + \gamma - \alpha) + B_\phi\}\tan\theta \tag{12}$$

Range lag may be obtained from graphs established for each type of bomb and is a function of dive angle ($\theta$), release altitude ($H_R$), true air speed (V), (at release) and of a ballistic coefficient ($C_X$) of the bomb. This relationship may be written thus:

$$B_\phi = W(\theta, H, V) \text{ for a ballistic coefficient } (C_X) \tag{13}$$

$$\alpha = G(\theta, H, V) \text{ for the airplane} \tag{14}$$

Equation 14 can be derived from a vector diagram of the forces acting upon the airplane during flight and data concerning airplane's lift coefficient.

$$\text{As before: } \theta = \sin^{-1}\frac{\dot{H}}{V} \qquad \text{see (3)}$$

By solving Equations 12, 14, 3, and the range log graph simultaneously using the method of successive approximation, a table can be made which gives the value of release altitude rate ($\dot{H}_R$) as a function of actual altitude (H) and true air speed (V). This table and the system of equations can be written thus:

$$\dot{H}_R = F(V, H) \tag{15}$$

where the effects of range lag ($B_\phi$) and angle of attack ($\alpha$) are considered.

Computations have shown that if a cam designed for the function (15) is positioned by modified air speed ($V_M$) and modified altitude ($H_M$) instead of true air speed (V) and actual altitude (H), the lift would be proportional to modified release altitude rate ($\dot{H}_{MR}$). This indicates that modified release altitude rate ($\dot{H}_{MR}$) is the same function of modified air speed ($V_M$) and modified altitude ($H_M$), and can be written thus:

$$\dot{H}_{MR} = F(V_M, H_M) \tag{15A}$$

Numerical proof has shown that Equation 15A is valid.

An approximate correction for any motion of the target and the wind, is obtained by first estimating components of the magnitude of target velocity ($V_T$) and wind velocity ($V_W$) in the direction of flight, and then adding these components to the modified air speed ($V_M$), of the airplane. The relation between target velocity ($V_T$), and wind velocity ($V_W$), and their components depends upon the dive angle which is continually changing. Since the correction for target speed and wind velocity is at best only approximate, an average dive angle for release ($\theta_M$), is assumed constant in making this correction. The component to be added to the modified air speed ($V_M$) equals $$(V_T + V_W)\sec\theta_M \tag{16}$$

THE SERVO-UNIT

The servo-unit (Fig. 4) consists of several separate mechanical devices including mechanisms responsive to changes in atmospheric pressure, and in the true air speed of airplane; a variable speed drive, and suitable motors for operating these devices.

A Pitot tube 10 mounted in the conventional way upon the airplane 9 (Fig. 1) is piped at 18 (Fig. 4), to the static pressure unit 20 and dynamic pressure unit 40, and at 19 to the dynamic pressure unit 40, in such a way that the static pressure unit 20 will respond only to the static atmospheric pressure ($P_S$) at the airplane, while the dynamic pressure unit 40 will respond to changes in the dynamic pressure ($P_D$), being the difference between the total pressure ($P_G$), and the static atmospheric pressure ($P_S$). One arrangement for a bomb releasing mechanism 12, amplifiers 13 and 14, computing mechanism 15 and line of sight defining means 16 is also set forth in Fig. 1.

Static pressure unit

The static pressure unit 20 includes an evacuated bellows element 21, and a balance arm 22 mounted thereon and pivoted at an intermediate point in any way preferably by means of a flexible strip 23. The opposite end of the balance arm is connected to a calibrated spring 24 which is attached to a rack 37 so that the tension of the spring 24 will vary dependent upon the direction and extent of movement of the rack 37. The assembly is enclosed in a housing 39 sealed to define a chamber, which is piped at 18 to the atmospheric pressure side of the Pitot tube, so that the bellows 21 will contract or expand with any increase or decrease of static pressure, thereby advancing or retracting the opposite end of the balance arm 22. A contact 26, carried by the balance arm 22, makes and breaks contact with a stationary contact 25, mounted upon the frame of the static pressure unit 20.

The bellows 21 and calibrated spring 24, are so adjusted that the bellows normally tends to counterpoise the force exerted by the calibrated spring, and bias the balance arm against the fixed contact 25, so as to close contacts 25 and 26. A dither or auxiliary spring 27 is connected between the end of the balance arm 22, and an eccentric 32 driven by the constant speed motor 70. The tension of the dither spring 27 changes periodically under control of the eccentric 32, driven by the constant speed motor 70 to move the balance arm 22 away from and towards the fixed contact 25 when the tension on the dither spring is either increased or reduced to change the counterpoise between the belows 21 and the calibrated spring 24, thus periodically opening and closing the starting circuit of the static pressure ($P_S$) motor 80 in a manner hereinafter more fully described.

The static pressure motor 80 is coupled through a worm 81, differential 82, gear 83, shaft 79, and gear 78, to the shaft 75 of the constant speed motor 70, in such a way that the static pressure motor 80 when in motion tends to cancel and nullify the effect of the constant speed motor 70 upon the shaft 89, thus rendering the constant speed motor 70 ineffective with respect to the shaft 89 so long as the motors 80 and 70 are revolving in equilibrium, which condition exists when the motor 80 revolves for only a certain specified portion of each periodic cycle of the balance arm 22 and movable contact 26, which in turn is dependent upon the duration of the closure of the circuit controlled by contacts 25 and 26, which closure period will be altered by a change in static pressure in the Pitot tube 10.

Any momentary expansion or contraction of the bellows 21, will affect the counterpoise between the bellows and the calibrated spring 24, thus increasing or decreasing the dwelling time for each closure of the circuit contacts 25 and 26, to correspondingly vary the drive period of the static pressure motor 80, and change the setting of the shaft 89. Thus for example, any increase in atmospheric pressure of the air in the Pitot tube 10 due to a change in the altitude of the airplane, as by diving, causes the bellows to contract, thus increasing the length of the closure of the circuit contacts 25 and 26, and increasing the operating period of the static pressure motor 80. Subtracting differential 82 now drives bevelled gear 88, to change the setting of shaft 89, and gears 85, 86 and 87, to drive the pinion 38 and move the rack 37 of the static pressure unit 20 in a direction to increase the tension of the calibrated spring 24, and restore the counterpoise between the bellows 21 and balance arm 22, thereby restoring the control circuit for static pressure motor 80, and therefore the motor 80, to a condition of equilibrium with the constant speed motor 70.

When the airplane climbs the atmospheric pressure will fall, the bellows 21 will expand and again affect the counterpoise by moving the balance arm 22 and the contact 26 away from the fixed contact 25, thus increasing the gap between the contacts, and reducing the operating period of the static pressure motor 80. The constant speed motor 70 now changes the setting of the subtracting differential 82, and drives bevelled gear 88 to changes the setting of shaft 89, as well as the pinion 38 which actuates the rack 37 of the static pressure unit 20, and reduces the tension upon the calibrated spring 24 to change the counterpoise between the belows 21 and the balance arm 22, thus seeking to restore the motors 80 and 70 to equilibrium, and the normal counterpoise to the bellows 21 and the balance arm 22.

It therefore appears that any changes in airplane altitude, will either shorten or prolong the normal operating time of static pressure motor 80, thus driving the bevelled gear 88 to vary the settings of any of the computing mechanisms whose settings are affected by the settings of the shaft 89.

To prevent any injury to the rack 37 and calibrated spring 24, and to the motors 70 and 80, due to motor overdrive, limit switches 34 and 35, connected in series with their respective motor power circuits are mounted upon the same shaft as the pinion 38, so that when the shaft on which pinion 38 is mounted and which is driven by the motors 70 and 80, reaches the safe limit of rotation in either direction, one of the limit cams 33 or 36, operates one of the limit switches 34 or 35, to open the power circuit and shut off the corresponding drive motor, before any damage results.

Dynamic pressure unit

The dynamic pressure unit 40 likewise includes a bellows 41 having the chamber of the bellows piped at 18 to the static pressure side of the Pitot tube 10, so that the chamber within the bellows will be subjected to static atmospheric pressure ($P_S$). This bellows in turn is completely enclosed in a housing 59 to form a sealed chamber, piped at 19 to the total pressure chamber 17 of the Pitot tube 10, so that the housing surrounding the bellows will be subjected not only to atmospheric pressure but also to impact pressure which varies with any change in the velocity of the airplane relative to the surrounding air, generally called the true air speed, and designated V.

The sum of these two pressures is referred to as the "total pressure" designated ($P_G$), and the difference between the "total pressure" ($P_G$), and the static pressure ($P_S$) is referred to as the dynamic pressure which is designated $P_D$. Hence $P_D + P_S = P_G$; and $P_G - P_S = P_D$. Thus any changes in the altitude of the airplane affects both sides of bellows 41 equally, but any increase or decrease in the true air speed (V), causes the bellows 41 to contract, or expand, thus moving the balance arm 42 attached to the bellows, about a pivot which may be any suitable device, such as the flexible strip 43, to vary the angular position of the balance arm, thus changing the counterpoise normally produced upon the balance arm 42 by the action of the bellows 41 and the calibrated spring 44. This counterpoise is periodically varied by a dither or auxiliary spring 47 which changes its tension periodically under the control of an eccentric 52, to move balance arm 42, thus opening and closing the fixed and movable contacts 45 and 46 which control the starting circuit for the dynamic pressure ($P_D$) motor 60, in a manner hereinafter more fully described, to periodically start and stop the dynamic pressure ($P_D$) motor 60.

The dynamic pressure motor 60 is coupled to the shaft 69 of constant speed motor 70 through a worm drive 61, a subtracting differential 62, and the bevel gears 63, in such a way, that the dynamic pressure motor 60 when in motion, tends to cancel the effect of the constant speed motor 70 upon the shaft 69, thus rendering constant speed motor 70 ineffective with respect to the shaft 69 so long as the motors 60 and 70 are revolving in equilibrium, which condition will exist when the dynamic pressure motor 60 revolves for only a portion of each periodic cycle of the balance arm 42 and therefore of the circuit periodically established through the contacts 45 and 46.

Any increase in the airplane's true air speed (V), will contract the bellows 41 thus increasing the operating period of motor 60, in the manner described generally for motor 80, thus permitting motor 60 to impart a setting to the shaft 69 proportional to the increased dynamic pressure. The rack 57, pinion 58, calibrated and dither springs 44, and 47, balance arm 42, and the contacts 45 and 46, all function in the manner generally described for the static pressure unit, until the motors 60 and 70, are restored to a condition of equilibrium. Any decrease in the airplane's true air speed will expand the bellows 41, thus reducing the operating period of the motor 60, and permitting constant speed motor 70 to change the setting of the shaft 69 proportional to the decreased dynamic pressure. The rack 57, pinion 58, and calibrated and dither springs 44 and 47, now function in reverse, in the manner described generally for the static pressure unit, until the motors 70 and 60 are again restored to a condition of equilibrium.

To prevent any injury to the rack 57 and calibrated spring 44, or to the motors 60 and 70, due to motor overdrive, limit switches 54 and 55 which are connected in series with the motor starting circuits, are mounted upon the same shaft as the pinion 58, so that when the shaft on which the pinion 58 is mounted, and which is driven either by motor 60 or motor 70, reaches the safe limit of rotation in either direction one of the limit cams 53 or 56 will actuate its associated limit switch 54 or 55 to open the starting circuit of the corresponding drive motor, and shut off the motor before any damage results.

*Rate of change of altitude servo-mechanism and computer*

Having obtained measures of static pressure ($P_S$) and dynamic pressure ($P_D$), the problem resolves itself into devising a method of, and an apparatus for, computing the ideal modified altitude rate of the airplane for modified release altitude rate ($\dot{H}_{MR}$) by positioning the modified release altitude rate cam 140 (Fig. 5); for progressively computing the actual altitude rate of the airplane, by positioning the modified altitude rate ($\dot{H}_M$) cam 120; and for constantly comparing the lifts of these two cams (120 and 140), until the computations registered by the lifts of both cams are the same, whereupon release contacts 123, 148 carried by the bomb release actuating rods 122, 147 close a circuit to the bomb release solenoid 303 (Fig. 6) and the bomb is automatically released to descend upon the target.

The variable speed drive or speed measuring servo-mechanism (Fig. 4), includes a disc 100 revolving at a constant speed, driven through suitable reduction gearing 76 and shafts 75 and 77 from the constant speed motor 70. A sliding ball carriage 101 is mounted between the disc 100 and a rotatably mounted drum 117, the balls of the sliding ball carriage being in frictional engagement with the surface of the disc and drum, so that the speed of rotation of the drum will be dependent upon the extent of the radial movement of the ball carriage 101 relative to the axis of revolution of the disc 100. The rack 102 of the ball carriage 101 is provided with a limit cam 103, which is designed to operate the limit switches 104 and 118, which control the circuits to the split fields (Fig. 6) of the static pressure rate ($\dot{P}_S$) reversing motor 90, to prevent the static pressure rate motor from driving the sliding ball carriage 101 too far in either direction relative to the disc 100.

The direction and extent of movement of the ball carriage 101 is controlled by the rack 102 which is driven by a pinion from the static pressure rate motor 90, by way of a worm 91, wheel 92, and the reducing gear 93. Motor 90 is a reversing motor having split fields, connected respectively to the contacts 109 and 111 (Fig. 6), of a contact device 110, so that the direction and extent of rotation of the static pressure rate motor 90, will depend upon which split field (Fig. 6), happens to be connected through contact device 110, to the main power supply, at that particular moment, which in turn will depend upon the speed of shaft 112 and contact device 110, relative to shaft 107 and disc 108.

The direction and extent of rotation of shaft 107 is dependent upon the setting imparted to shaft 89 by gear 84 of the subtracting differential 82 under the influence of the static pressure motor 80 as it seeks to restore the counterpoise between bellows 21 and balance arm 22 of the static pressure unit 20, and to return to a condition of equilibrium with respect to constant speed motor 70.

The shaft 112 of the speed measuring servo-mechanism is driven by the constant speed motor 70, by way of the shaft 75, gear 76, shaft 77, disc 100, drum 117, gear 116, and a friction clutch mechanism including gear 113, clutch spring 114 and the collar 115.

The speed of rotation of the drum 117, and therefore of shaft 112, will vary dependent upon the setting imparted to the sliding ball carriage 101, by the static pressure rate motor 90, which constantly seeks to increase or decrease the speed of rotation of shaft 112 so as to keep shaft 112 rotating at the same speed as shaft 107, and in seeking to do this, the static pressure rate motor 90, through its reduction gearing 91, 92 and 93, also imparts a setting to the static pressure rate ($\dot{P}_S$) shaft 99, this setting of the shaft 99 being a measure of the speed of rotation of drum 117 and gears 116 and 113. When the servo-mechanism is in equilbrium the speed of shaft 112 will be substantially equal to the speed of shaft 107, which is driven through gears 105, 106 by static pressure shaft 89. The setting of static pressure rate shaft 99 is then a measure of the speed of rotation of static pressure shaft 89.

The static pressure rate motor is provided with a flywheel 96, of sufficient inertia to prevent the static pressure rate motor 90 from accelerating more rapidly than desired, when the change to be effected in the speed of drum 117 is small. An electro-mechanical break consisting of the electro-magnet 94 and a brake-shoe 95 is also provided for static pressure rate motor 90. The circuits for energizing the electro-magnet 94, are controlled by the contact device 110 and its associated contacts 109, 111, in a manner hereinafter more fully described.

Any change in altitude which affects the static pressure unit 20, also produces a change in the setting of the static pressure shaft 89, which rotates pinion 135 (Fig. 5), to rotate the cam 130, clockwise or counter-clockwise, and impart a lift to shaft 124, and translate the modified altitude rate cam 120. Thus the position of shaft 89 and therefore the position of the modified altitude rate cam 120, is a measure of any change of altitude of the airplane 9 (Fig. 1).

Figure 1:
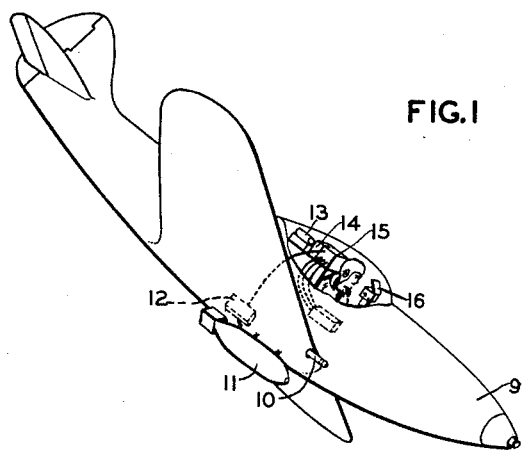
Fig. 1 is a perspective view of an airplane, showing the general location of the bomb, and of the bomb-release mechanism.

The relationship between the disc 100, drum 117, static pressure shaft 89, static pressure rate motor 90, rack 102 and its associated pinion, and ball carriage 101, is such, that the direction and extent of movement transmitted by the static pressure rate motor 90 to static pressure rate shaft 99 is a measure of the time rate of change of the static pressure at the airplane 9 (Fig. 1). This measure is referred to in Equation 10A ante, by the symbol $\dot{P}_S$. The static pressure rate shaft 99, through suitable gearing 126 and a pinion 125 (Fig. 5), rotates the modified altitude rate cam 120 clockwise or counter-clockwise, dependent upon the direction and extent of movement of the static pressure rate motor 90 to modify the position of modified altitude rate cam 120.

Thus a train of operation initiated by a small change in altitude of the airplane 9 (Fig. 1), which effected a small change in the length of the bellows 21 of the static pressure unit 20, sets in motion a train of interdependent electro-mechanically operated devices to impart a certain setting to the modified altitude rate cam 120, which setting is a function of any change of static pressure at the airplane 9, and of the time rate of change of static pressure rate (Equations 10 and 10A ante).

COMPUTER UNIT

Air speed computer

The air speed computer (Fig. 5), includes a carriage 150 which is laterally movable under control of the dynamic pressure shaft 69. Lead screw 153, driven by dynamic pressure shaft 69, meshes with carriage 150 to impart lateral movement thereto in either direction, dependent upon the direction and extent of any change in the setting of dynamic pressure shaft 69. A rack 152 slidably supported in the carriage 150, is movable in a direction transverse to the lateral movement imparted to the carriage by the shaft 69.

A long pinion 151 driven by the static pressure shaft 89 through suitable gear 137 and 138, and shaft 139, meshes with rack 152, to impart transverse movement to the rack in either direction, dependent upon the direction and extent of movement of static pressure shaft 89. Rack 152 carries a roller 156, which operates freely in the elongated slot 157 of a sector arm 154. Sector arm 154 which is pivotally mounted at 158, includes a gear sector 155. Thus roller 156 follows any movement of the rack 152, either laterally under control of dynamic pressure shaft 69, or transversely under control of static pressure shaft 89, to swing the sector arm 154 either clockwise, or counterclockwise about the pivot 158, through an arc of varying degree, to rotate the pinion 159 which meshes with gear sector 155, thereby rotating spiral cam 161, through an arc which is proportional to a function of the dynamic pressure divided by the atmospheric pressure registered by the dynamic pressure unit 40, and the static pressure unit 20, respectively, and which may be expressed as $$f\left\{\frac{P_D}{P_S}\right\}$$

as appears in Equation 11A.

Lever arm 167 is provided with a ball bearing roller 165 rotatably mounted about a fixed axis upon the lever arm. Lever arm 167 is pivotally mounted at 168 with respect to the disc 160 which carries the spiral cam 161, so that the ball bearing roller 165 engages in and follows the spiral cam 161, to swing the lever arm 167 either clockwise or counterclockwise through an arc of varying degree to a seting which is a function of $$\frac{P_D}{P_S}$$

of the form:

$$7RT_C\left\{\left(1+\frac{P_D}{P_S}\right)^{\frac{1}{3.5}}-1\right\}$$

as appears in Equation 11A. The lever arm 167 includes a gear sector 163 which meshes with a circular rack 162, forming a part of the modified release altitude rate cam assembly, so that the sector gear 163 and rack 162 translate the modified release altitude rate cam assembly, and impart a lift to the modified release altitude rate cam follower 147, which lift is a function of the true air speed of the airplane.

Temperature and pressure compensatory mechanism

From a study of all available data obtained from meterorological observations, weather reports, and the like, the temperature at some selected predetermined elevation (e.g. 3500 feet) above the target corresponding to the average release altitude, and the pressure at the target, are estimated, and the hand knob 200 is operated to register the estimated temperature above the target at the selected elevation, upon the dial 201, of the temperature indicator, and the hand knob 202 is operated to register the estimated pressure at the target ($P_T$) upon the dial 203 of the pressure indicator. Manipulating these hand knobs 200 and 202 operates some suitable mechanism such as the gear trains 206, 205 and 207, 204 to visibly register the settings thus selected, one upon the dial 201 of the temperature indicator, and the other upon the dial 203 of the pressure indicator, and to impart particular settings to the shafts 208 and 209.

When the knob 200 is manipulated to set the estimated temperature at an altitude of 3500 feet, motion is supplied to shaft 208 to move the pinion 132 and rack 131 of the cam 130, to translate the cam 130 to a particular setting so that the translation imparted to cam follower 124, will be proportional to the square root of the absolute temperature in degrees Kelvin corresponding to the estimated temperature value registered upon the dial 201. The static pressure shaft 89 rotates the pinion 135 to rotate the cam 130, and impart a translation to follower 124 and modified altitude rate cam 120 which is proportional to the reciprocal of the static pressure $$\frac{1}{P_S} \quad (1)$$

The combined effect of this translation and rotation of the cam 130, is to impart translation to cam follower 124 and modified altitude rate cam 120, which is proportional to $$\frac{\sqrt{T}}{P_S} \text{ or } \frac{\dot{H}_M}{\dot{P}_S}$$

The static pressure rate shaft 99 turns the pinion 125 which rotates the modified altitude rate cam 120 to a particular seeting, which cam setting is proportional to the static pressure rate. The combined effect of the rotation imparted to the modified altitude rate cam 120 by static pressure rate shaft 99, and the translation imparted by cam 130 to cam follower 124 and modified altitude rate cam 120, lifts the modified altitude rate cam follower 122, by an amount proportional to $$\frac{\sqrt{T} \times \dot{P}_S}{P_S}$$

or modified altitude rate in accordance with Equation 10A. This lift of the modified altitude rate cam 120, and of its follower 122 represents the modified altitude rate of the airplane.

Figure 6:
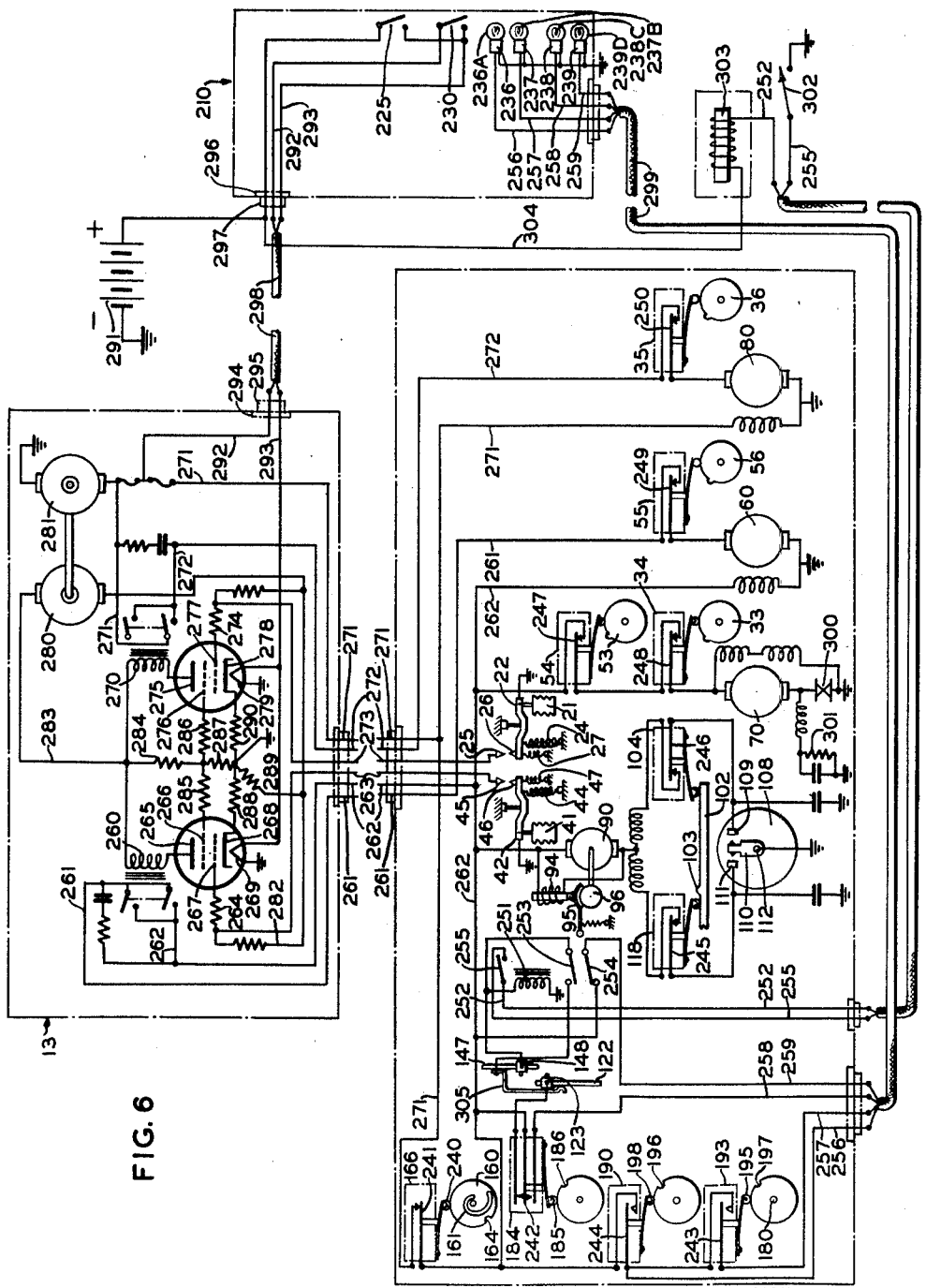
Fig. 6 is a schematic diagram showing the wiring connections of the electrical equipment.

When the target pressure orienting cam and switch apparatus are used, shaft 208 will also rotate shaft 199 and gear 194 of the said apparatus, to rotate rocker arm 192, and the micro-switch 193 supported by the rocker arm, to a new angular position, relative to the detent in the "fine" calibration cam 197. Any change in the angular position of the rocker arm 192, moves the cam follower 195 of the micro-switch 193 towards or away from the detent in cam 197, thus advancing or retarding the registery of cam follower 195 in the detent in the "fine" calibration cam 197, whose cam setting is controlled by the output of subtracting differential 176 according to the altitude above the target through shafts 144 and 180, to advance or retard the completion of the electrical circuit controlled by the micro-switch 193 for lighting the "fine" calibration light 237 (Fig. 6).

The dial 203 of the target pressure indicator is graduated with logarithmic spacing, so that the setting imparted to the shaft 209 of the pressure indicator 203, and through the gears 178, 177, 175 to the subtracting differential 176, will be proportional to the logarithm of the pressure value at the target ($P_T$), recorded on the dial 203. The subtracting differential 176, is also supplied with another logarithmic value introduced by means of barrel cam 170 under control of the static pressure shaft 89; shaft 89 moves gear 171 to actuate barrel cam 170, thus moving cam follower 172, follower rack 173, pinion 174, and gear 175, also the subtracting differential 176, by a value proportional to the logarithmic value of the static pressure of the air at the airplane. The output of the subtracting differential 176 therefore turns gear 145 and shaft 144 an amount equal to:

$$\log_{10} P_T - \log_{10} P_S$$

which amount is a function of a log of the craft altitude, relative to the target, as modified by other factors herein set forth. Shaft 144 turns pinion 146 to modify the setting of the modified release altitude rate cam 140 in the same proportion. The gear 141 is keyed to modified release altitude rate cam 140, but not to the shaft of the rack 162, hence when the pinion 146 rotates the gear 141 and modified release altitude rate cam 140, it rotates the cam 140 on the lead screw 141′, thus translating the cam and introducing a slight error in the modified air speed setting of the modified release altitude rate cam 140, which is compensated for by an appropriate "skewing" of the cam data.

The setting imparted to the subtracting differential 176 by the manipulation of knob 202, rotates gear 145 and the shaft 144, which in turn rotates gear 181 and the cam shaft 180. The "fine" calibration cam 197 turns with cam shaft 180 to modify the angular position of its detent with respect to the cam follower 195 of the micro-switch 193. The movement of cam shaft 180 also operates the reduction gears 182, 183 to rotate shaft 187 which drives gear train 189, 188 to turn the "coarse" calibration cam 196, and the "altitude limit" cam 186, to modify the angular position of their respective detents, with respect to the cam followers 198 and 185 of the micro-switches 190 and 184. Any change in the angular position or setting of the cams 196, 186, tends to advance or retard the completion of the electrical circuits controlled by the micro-switches 190 and 184, for lighting the "coarse" calibration lamp 236 and the "altitude limit" lamp 238 (Fig. 6) whose respective functions are hereinafter more fully described.

The system is designed so that the pilot, while approaching the target at a predetermined altitude (e.g. 3500 feet above the target), may read a free air temperature thermometer and set hand knob 219 of control box 210, located in the cockpit of the aircraft, until the temperature value indicated upon the dial 212 corresponds to the temperature reading observed on the free air temperature thermometer. Manipulating knob 219 operates gear train 217, 211 to register this temperature upon dial 212; it also operates gear train 214, 213 to move the flexible extension of shaft 208, and operate gears 133, 134 to rotate the pinion 132, translate rack 131 and cam 130, thus actuating lift pin 124 to modify the setting of modified altitude rate cam 120 by a value which is proportional to the square root of the temperature value appearing upon the dial 212.

After recording the temperature value at the selected predetermined altitude (3500 feet above the target) upon the dial 212 of the cockpit control box 210, the pilot, if the enemy resistance is light enough to permit, descends to a lower altitude as predetermined for each computer (e.g. 100 feet above target), and while flying at such selected lower altitude, proceeds to introduce the temperature and pressure settings at said lower altitude. The pilot first makes a setting for the temperature at said lower altitude (e.g. 100 feet above the target), by first observing the temperature reading of the free air temperature thermometer, and then manipulating the hand knob 219 of the cockpit control box 210, until the temperature value indicated upon the dial 212 corresponds to the temperature reading observed on the free air temperature thermometer. The flexible extension of the shaft 208 operates to rotate shaft 199, which rotates the rocker arm 192 to modify the angular position of the cam follower 195 of micro-switch 193 with respect to the detent in the "fine" cam 197 whose setting it has been shown was dependent upon the setting of the subtracting differential 176. The rotation of the rocker arm 192 by the temperature knob 219 is to insert the temperature at 100 feet which differs from the constant temperature upon which the modified altitude is based. In this manner, the actual altitude (as distinguished from modified altitude) at 100 feet is used in setting shaft 209 according to target pressure by adjusting the position of micro-switch 193 relative to "fine" cam 197.

Differential 176 is operated by one of the knobs 202 or 224 of the pressure indicator 203 or 218, and by the setting of the static pressure shaft 89. The pilot next proceeds to improve the original setting for the estimated target pressure by manipulating knob 224 of the cockpit control box 210, while observing the target pressure orienting lamps 236 and 237. Manipulating the knob 224, rotates gear train 223, 216 to indicate the corrected pressure setting upon the target pressure dial 218, which is graduated with logarithmic spacing; it also rotates gear train 221, 220 to turn the flexible extension of the shaft 209 to modify the setting of the subtracting differential 176, and rotate gear 145, shaft 144, and cam shaft 180. Cam shaft 180 in turn modifies the setting of the "fine" cam 197, "coarse" cam 196, and "altitude limit" cam 186, and as the pilot approaches the proper target pressure the cam follower 198 of micro-switch 190 registers in the detent of the "coarse" cam 196, and a circuit is closed at contact spring 244 of micro-switch 190 (Fig. 6) over lead 256 to light the "coarse" target pressure orienting lamp 236.

The "fine" target pressure orienting lamp 237 flashes when the cam follower 195 of micro-switch 193 registers in the detent of the "fine" cam 197 to close a circuit at contact spring 243 of micro-switch 193, in series with the contact springs of micro-switch 190, to light the lamp as a visual signal, thus indicating to the pilot that he has introduced the exact pressure at the target into the apparatus.

The detents in the cams 196 and 197 are made long enough to permit their associated cam followers 198 and 195 to register in the detents in the cams and close the lamp circuits through the contact springs 244 and 243 for a sufficient length of time to allow the target pressure orienting lamps to reach incandescence. The lamps are allotted a distinctive color, such as amber. When the "fine" pressure orienting lamp 237 flashes, the pilot stops manipulating the knob 224 and leaves it set at the "flash" setting. So long as the plane continues to fly at the predetermined altitude (e.g. 100 feet above the target) the lamps 236 and 237 remain lighted, as a visible indication to the pilot that the proper target pressure ($P_T$), has been introduced into the system. The temperature at the predetermined altitude above the target (e.g. 100 feet), must be introduced into the apparatus before orienting the target pressure dial 218 to correct the 100 feet of actual altitude to the equivalent modified altitude for the given temperature. This correction can only be made if the pilot descends to said lower altitude (e.g. 100 feet), and orients the target temperature dial 212 while flying at the said lower altitude to correctly position micro-switch 193.

As the airplane 9 ascends to a higher altitude, the change in the static pressure of the air at the airplane is registered by the static pressure servo (Fig. 4) on the static pressure shaft 89, which varies the setting of the subtracting differential 176, thus turning gear 145 and shaft 144 to change the angular positions of the cams, causing first the cam follower 195 and then cam follower 198 to ride out of the detents in the cams 197 and 196 thus opening the contact springs 243 and 244 of the micro-switches 193 and 190 to extinguish first the "fine" and then the "coarse" target pressure orienting lamps 237 and 236. If the plane ascends above the computing range of the apparatus, the roller 185 of micro-switch 184 will register in the detent in the altitude limit cam 186, transferring contact spring 242 (Fig. 6) from the back to the front contact, thus disconnecting bomb release contact 123 and closing an electrical circuit over lead 258 to lamp 238 (red lamp cap) thus lighting the lamp as a visible signal to the pilot, that the airplane is above the computing range of the apparatus, and that he must not depress the trigger switch 302 (Fig. 6) on the control stick to prepare the energizing circuit for bomb release solenoid 303, so long as red lamp 238 remains lighted. When the airplane descends to a level which corresponds with the upper limit of the computing range of the instrument, cam follower 185 of micro-switch 184 leaves the detent in cam 186, and the red lamp 238 is extinguished, thus notifying the pilot that he may press trigger switch 302.

After the pilot determines the direction of the bombing run, he estimates the speed of the target, and makes a correction upon the target velocity dial 228, to compensate for the component estimated target speed in the direction of flight. After determining the direction and velocity of the wind, the pilot manipulates knob 235 of the cockpit control 210, while observing the setting of the wind velocity dial 229 against the modified zero setting of the dial 228 to register the components of the wind's velocity that lie along the direction of flight. The dial 229 has a center zero scale, so that it can be turned clockwise or counter-clockwise to correct for either a "head" or a "tail" wind component. Manipulating knob 235 turns shaft 233 to operate gear train 234, 226 to turn shaft 227 and wind velocity dial 229. Shaft 233 also rotates gear train 232, 231 and the flexible extension of shaft 169, which operates the pinion 142 through suitable gearing, to a setting proportional to the sum of the components of estimated velocities of the target and the wind in the direction of flight. Pinion 142 operates the gear 143 which is keyed to the threaded portion of the shaft of the modified release altitude rate cam 140, thus translating the modified release altitude rate cam 140 to a modified setting to compensate for the target velocity and wind velocity corrections. The pinion 146 which engages the gear 141 keyed to the modified release altitude rate cam 140 prevents the cam from rotating in unison with the pinion 142 and gear 143.

CONTROL CIRCUITS AND APPARATUS

If due to mechanical failure the value of the setting of the cam 160 becomes too large or too small, cam follower 240 will register in the detent 164 of cam 160 (Fig. 5), thus opening contact spring 241 of micro-switch 166 (Fig. 6) to shut off the power supplied over main battery supply lead 271, to all of the motors, except the static pressure motor 80. Static pressure ($P_S$) motor 80 continues to run and operates through differential 82 to bring the cam 160 back from its extreme position, whereupon cam follower 240 leaves the detent 164 and contact spring 241 closes to re-establish the circuit for supplying power over lead 271 to the motors 60, 70 and 90.

When the ball carriage 101 approaches either extreme limit of movement with respect to the disc 100 (Fig. 4) the limit cam 103 on rack 102 (Fig. 6) engages the cam follower of one of the micro-switches 118 or 104 to operate one of the contact springs 245 or 246 and open the circuit to the energized split field of the static pressure rate ($\dot{P}_S$) motor 90, thus opening the motor circuit and the control circuit for the electro-magnetic brake 94, to apply the brake 95 and arrest the motion of fly-wheel 96. When shaft 107 turns disc 108 to bring one of the switch contacts 109 or 111 as the case may be, into contact with contact device 110 a circuit is closed through the opposite split field to drive static pressure rate ($\dot{P}_S$) motor 90 and rack 102 in the reverse direction, thus releasing the cam follower and closing the contact spring 245 or 246 to partially re-establish the circuit to the corresponding split winding.

Figure 4:
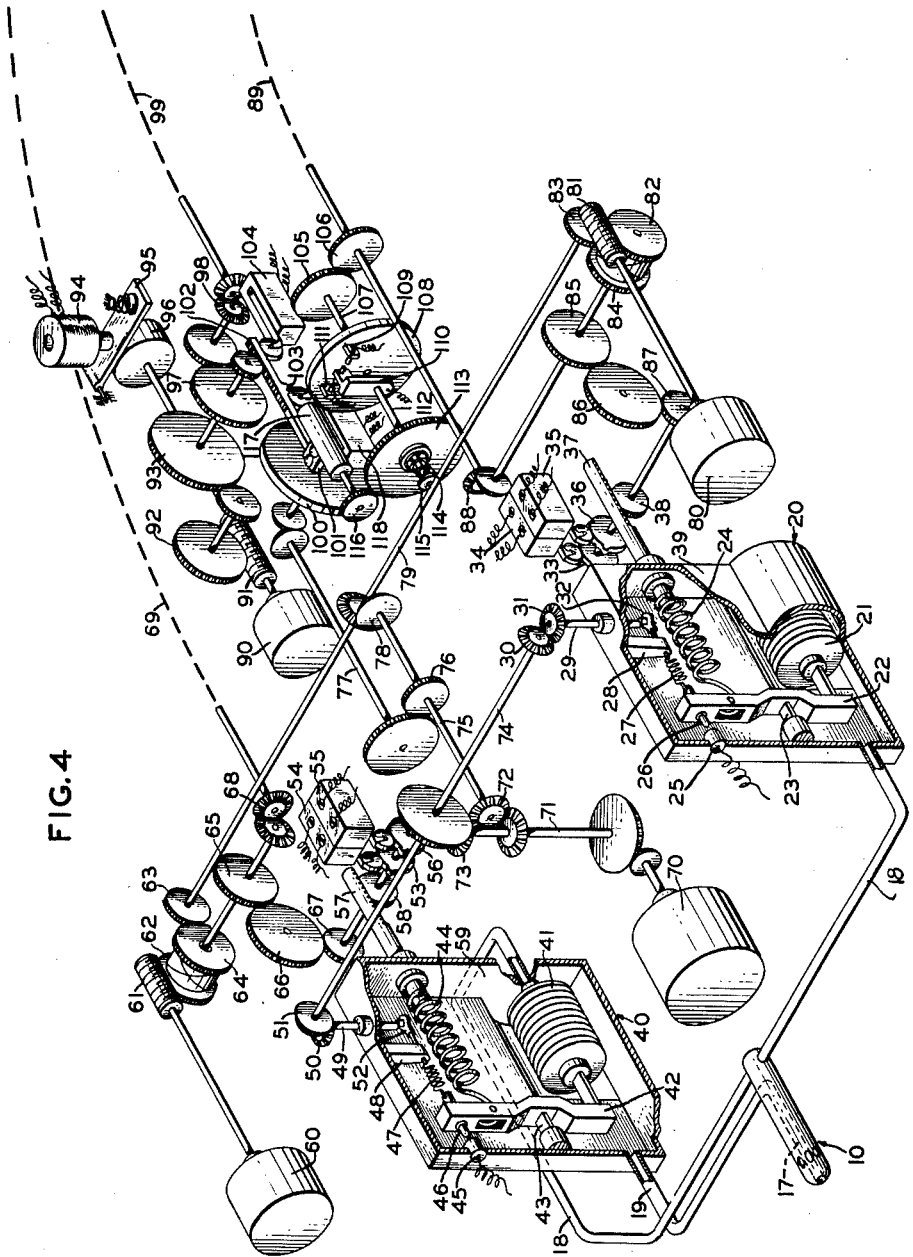
Fig. 4 is a diagram of the servo-mechanism, with certain of the parts partially broken away.

The limit switches 35 and 55 are operated by the limit cams 36 and 56 respectively, when the cam shafts to which these limit cams are keyed reach the extreme limit of travel under control of the static pressure motor 80 or the dynamic pressure motor 60. Contact spring 250 of limit switch 35 opens the power circuit to the static pressure ($P_S$) motor 80, and contact spring 249 of limit switch 55 opens the power circuit to the dynamic pressure ($P_D$) motor 60, to stop either motor 80 or motor 60, as the case may be, to prevent damage due to jamming of the racks 37 and 57; pinions 38, 58; or calibrated springs 24, 44; of the pressure units 20 and 40; or any stalling or burning of the motors 80 and 60 (Fig. 4). Constant speed motor 70 continues to rotate and drives the cam shaft back, thus releasing the limit switch 35, or 55, and re-establishing the power circuit to re-start the affected motor.

One of the limit switches 34 or 54 is operated by its associated limit cams 33 or 53, when the cam shafts to which these limit cams are keyed reaches the extreme limit of travel under control of the constant speed motor 70. Contact spring 247 or 248 is thereupon opened to open the power circuit of motor 70 and stop the motor, thereby preventing damage to the racks, pinions, and springs, of the pressure units 20 or 40, or stalling or burning of the motor. Either dynamic pressure motor 60 or static pressure motor 80, as the case may be, will continue to operate and drive the cam shaft back, thus releasing the limit switch 54 or 34, and re-establishing the power circuit to re-start constant speed motor 70.

The toggle switch 225 (Fig. 6) which is open when the apparatus is not in use, controls the circuit over lead 293 for the filaments 269 and 279, and supplies main battery to toggle switch 230 which is now closed to connect the main battery 291 to lead 292 to start motor 281, and to lead 271 to prepare the circuit for ultimately supplying main battery to: (a) the proceed lamp 239 through contact spring 241 of micro-switch 166, through the back contact and armature 254 of relay 251, over lead 259, through lamp 239 to ground, lighting lamp 239; (b) the reticle light (not shown) in the sighting instrument 16 which is lighted in parallel with lamp 239 over a circuit (not shown) to illuminate the reticles; (c) the field of static pressure motor 80; (d) the field of dynamic pressure motor 60, and the armatures and fields of constant speed motor 70 and of static pressure motor 90, under control of contact spring 241 of micro-switch 166; (e) "coarse" target pressure orienting lamp 236 under control of micro-switch 166, to micro-switch 190, where the circuit to lead 256 of flexible cable 299 is open; (f) "fine" target pressure orienting lamp 237, under control of micro-switch 166 to micro-switches 190 and 193, where the circuit to lead 257 of flexible cable 299 is open; (g) bomb release contact 123 under control of micro-switches 166 and 184.

Motor 281 drives generator 280 which supplies a regulated voltage through the resistances 284, 285, 286, 287, 288, 289, 290, 264, and 274, to apply voltages of the proper polarities and values to the grids, screens and plates of the electron tubes.

Grids 267 and 277 are normally biased beyond cut off.

Whenever balance arm 22 of the static pressure unit 20 closes, moving contct 26 against stationary contact 25, solid ground is applied over lead 273 to remove the negative bias from the grid 277 and energize the power relay 270, thus closing a circuit from main battery lead 271 through the double armature and double contact of power relay 270 to lead 272, to apply main battery 291 to the armature of the static pressure motor 80, which operates and functions in the manner previously described. When balance arm 22 releases, the solid ground is removed from grid 277 and a negative bias is restored to the grid. Power relay 270 now releases, thus disconnecting main battery 291 from the armature of static pressure motor 80 and stopping the motor. Similarly whenever the balance arm 42 of dynamic pressure unit 40 closes, moving contact 46 against stationary contact 45, solid ground is applied over lead 263 to remove the negative bias from the grid 267 and energize power relay 260, thus closing a circuit to connect main battery from the supply lead 271 through contact spring 241 of micro-switch 166 over lead 262, through the double armature and double contact of power relay 260 to lead 261, contact spring 249 of micro-switch 55, and the armature of the dynamic pressure motor 60, which operates and functions in the manner previously described. When balance arm 42 releases, the solid ground is removed from lead 263 and a negative bias is restored to grid 267. Power relay 260 now releases, thus removing main battery 291 from lead 261 and the armature of dynamic pressure motor 60, and stopping the motor.

*Bomb release circuit*

The modified altitude rate cam 120 imparts a lift to the bomb release actuating rod 122 which operates the bomb release contact 123. Similarly the modified release altitude rate cam 140 imparts a lift to the bomb release actuating rod 147 which operates the bomb release contact 148. When the modified altitude rate of the airplane for release of the bomb, registered by the modified altitude rate cam 120, and the modified altitude rate of the airplane for release of the bomb, registered by the modified release altitude rate cam 140, are equal, the bomb release actuating rods 122 and 147 bring the bomb release contacts 123 and 148 into electrical contact, thus establishing the operating circuit for relay 251, which operates and locks up through its armature 253 and front contact, and the spring contact 305 and bomb release contact 123. Relay 251 when operated: (a) closes a circuit from main battery 291 over lead 304, through bomb release solenoid 303, lead 252, and through the armature and front contact of relay 251, lead 255, and trigger switch 302 mounted upon the control stick, to ground, thus operating the bomb release solenoid 303 to release the bomb from its shackle and initiate its flight toward the selected target; and (b) opens the circuit previously established through the back contact and armature 254 of relay 251, over lead 259 of flexible cable 299 to the lamp 239 and to the reticle lamp (not shown) connected in parallel with lamp 239, extinguishing these lamps as an indication that the bomb has been released from its shackle.

PRINCIPLE OF OPERATION

The principle of operation is as follows: Before leaving the ground the knob 200 is manipulated to record the estimated temperature at an altitude of 3500 feet above the target upon dial 201 thus imparting a lift to the modified altitude rate cam 120. Knob 202 is also manipulated to record the estimated pressure at the target upon dial 203, and to operate subtracting differential 176 to rotate the modified release altitude rate cam 140 by an amount which is proportional to the logarithm of the recorded pressure.

Upon taking off, the toggle switch 225 is closed to complete a circuit for heating up the cathodes 268, 278 of the electron tubes, and toggle switch 230 is then closed, to light the green lamp 239 and the reticle light, and to start motor generator 281, 280 and constant speed motor 70. The constant speed motor 70 turns static pressure shaft 89 and gear 106 (Fig. 4), which turns gear 105, shaft 107 and disc 108, to ground one of the switch contacts 109 or 111 at contact device 110, thus closing a circuit to release brake 95 and start the static pressure rate motor 90, to drive rack 102 and ball carriage 101, and set static pressure rate shaft 99. The constant speed motor 70 also drives: (a) shaft 74 (Fig. 4) to turn shafts 29 and 49, thus operating the eccentrics 32 and 52 to dither the springs 27 and 47; and (b) shaft 79 to turn the subtracting differentials 62 and 82, and operate pinions 58 and 38, racks 57 and 37, and calibrated springs 44 and 24, to apply ground to each of the stationary contacts 25 and 45, thus removing the grid bias from the grids 267 and 277 and operating power relays 260 and 270 to close the starting circuits for dynamic pressure ($P_D$) motor 60 and static pressure ($P_S$) motor 80, respectively.

Approaching the target at an altitude of approximately 3500 feet above the target, the pilot reads the temperature of the free air thermometer, and manipulates knob 219 of the cockpit control box 210, until the reading upon the dial 212 corresponds with the temperature reading of the free air thermometer. This operation improves the original temperature setting made before leaving the ground. The flexible extension of shaft 208 turns gears 133 and 134 and pinion 132, to modify the setting of the modified altitude rate cam 120. (When setting the temperature at 3500 feet the rocker arm 192 is also displaced, but serves no useful function at this time.)

If the pilot encounters heavy enemy resistance in the region of the target, or if for any other reason a low altitude approach is not possible, the pilot may proceed forthwith to make his bombing run, whereupon the apparatus operates and functions in the manner hereinafter more fully described. If, however, conditions are favorable to an approach at low altitude the pilot descends to a predetermined altitude (e.g. 100 feet) above the target, to obtain a more accurate value of the target pressure. The pilot first observes the reading of the free air thermometer and manipulates the knob 219 to register the observed temperature upon the dial 212 of the cockpit control box 210, and vary the angular position of the rocker arm 192 and of the cam follower 195 with respect to the detent in the "fine" cam 197. The pilot next manipulates the knob 224, while observing the target pressure orienting lights 236 and 237. Manipulating knob 224, turns shafts 209 and 144, and cam shaft 180, thus causing the detent in the "coarse" cam 196 to register with cam follower 198 of micro-switch 190 to light the "coarse" calibration lamp 236, and then the detent in the "fine" cam 197 to register with cam follower 195 of micro-switch 193 to flash the "fine" calibration lamp 237. When the "fine" lamp 237 flashes, the pilot stops turning knob 224, and the lamps 236 and 237 remain lighted, as a visible indication that the proper correction for the pressure at the target has been made upon the target pressure calibration switch.

After making the temperature and pressure settings at 100 feet above the target, the pilot climbs to attain altitude for commencing the bombing run. This altitude can be above the computing range of the apparatus. While the airplane 9 is attaining altitude for the bombing run, the pilot either again observes the temperature reading of the free air thermometer at 3500 feet, or assumes the previous temperature for 3500 feet, and again manipulates the knob 219, to once again modify the position of cam follower 195 to correspond with the temperature reading registered upon the dial 212, and translate the cam 130. If the airplane 9 attains an altitude above the computing range of the apparatus, the static pressure unit 20 will move the static pressure shaft 89 to a setting which will turn subtracting differential 176, shaft 144, cam shaft 180, and shaft 187, so as to vary the position of the altitude limit cam 186, and cause the roller 185 of micro-switch 184 to register in the detent in the cam 186 to (a) close the circuit to light the lamp 238 as a visible indication that the aircraft 9 is above the computing range of the apparatus; and (b) open the circuit for energizing relay 251, to prevent any premature closure of trigger switch 302 from energizing the bomb release solenoid 303 to effect the premature release of the bomb 11. When the airplane 9 descends to an altitude within the upper limit of the computing range of the apparatus, cam follower 185 of micro-switch 184 leaves the detent in cam 186, lamp 238 is extinguished (as a visible signal that the pilot may close the trigger switch 302 if his reticle is on the target), and the path for energizing relay 251 is extended through contact spring 242 of micro-switch 184 to the bomb release contact 123.

After deciding the direction of approach, the pilot first adjusts the dial 228 to indicate the direction and estimated speed of the target, and then manipulates knob 235 to register the direction and estimated velocity of the wind upon the dial 229. Knob 235 turns shaft 169, pinion 142 and gear 143 which is keyed to the lead screw portion of the modified release altitude rate cam 140, thus translating the modified release altitude rate cam 140 to a modified setting which is proportional to the sum of the estimated direction and velocity of the target and the wind.

If he has not already done so, the pilot now aligns the target in the reticles of the sighting instrument and initiates the bombing run while at all times retaining the reticles in alignment with the target. With the lamp 238 extinguished, the trigger switch 302 is depressed to prepare the energizing circuit for the bomb release solenoid 303, which circuit remains open at the armature of relay 251. As the aircraft 9 descends, the evacuated bellows 21 of static pressure unit 20 responds to variations in static pressure, while the bellows 41 of dynamic pressure unit 40, responds to any difference between the total pressure and the static pressure, otherwise designated the dynamic pressure, at the aircraft 9.

The displacement of the rack 37 is calibrated for various values of static pressure, so that the static pressure ($P_S$) shaft 89 rotates the cam 130, to give a translation to the modified altitude rate cam 120 which is inversely proportional to the static pressure of the air at the aircraft. The speed measuring servo-mechanism, including static pressure rate motor 90, operates to impart a setting to static pressure rate shaft 99, which is a measure of the time rate of change of the static pressure at the aircraft 9. This setting of static pressure rate shaft 99 rotates the modified altitude rate cam 120 to translate the modified altitude rate follower 122. The combined effect of these several inputs upon the translation of the modified altitude rate follower 122, is a measure of the modified altitude rate of the airplane.

The displacement of the rack 57 is calibrated for varying dynamic pressures, so that the dynamic pressure shaft 69 displaces roller 156 and carriage 150 laterally, by a value proportional to the dynamic pressure at the airplane, while the extension 139 of static pressure shaft 89 displaces rack 152 and roller 156 transversely by a value proportional to the static pressure of the air at the airplane static pressure. The combined effect of the inputs of the dynamic pressure shaft 69 and the static pressure shaft 89 rotates the cam 160, which imparts a lift to sector gear 163 circular rack 162 and the modified release altitude rate cam 140, which is proportional to the modified air speed. The position thus imparted to the modified release altitude rate cam 140 is further modified by a value proportional to the algebraic sum of the components of the target velocity and wind velocity ($V_W$) which value inserted at the pinion 142, was introduced into the system manually, in the manner previously described, and in accordance with Equation 16.

The dial 218 of the pressure indicator, mounted in cockpit control box 210, is graduated with logarithmic spacing, so that when the pilot manipulated knob 224, the setting imparted to the flexible extension of shaft 209 of the pressure indicator, and through gears 179, 178, 177, 175 to the subtracting differential 176, was proportional to the logarithm of the pressure value at the target ($\log_{10} P_T$) registered upon the dial 218. The rotary setting imparted to static pressure shaft 89 by the static pressure motor 80 during the dive, also rotates drum cam 170 to reduce the value of the logarithmic setting introduced into subtracting differential 176 when knob 224 was manipulated, by a value proportional to the logarithm of the static pressure of the air at the aircraft ($\log_{10} P_S$). The subtracting differential 176 turns gear 145 to rotate pinion 146 and the modified release altitude rate cam 140 to a setting having a value proportional to the modified altitude. As shown by the Equations 15A, 8A and 7A, the lift obtained when the modified release altitude rate cam 140 is positioned by rotating it in modified altitude and translating it in modified air speed is a measure of modified release altitude rate.

Thus it appears that before the aircraft dives, one of the variable components, the pressure at the target is either approximately or accurately determined and manually introduced into the computer; and that values representative of the other variable components ($P_D$, $P_S$), are continuously and automatically set into the modified release altitude rate cam 140, so that during the dive the changing lift of the modified release altitude rate cam 140, and therefore of its cam follower bomb release actuating rod 147, is at all times a correct measure of the altitude rate necessary for release. In this manner the rod 147 is positioned according to the altitude rate which the plane must be diving to assume, for the value of air speed by which the cam 140 is translated, the correct diving angle for releasing the bomb to hit the target. This diving angle, and hence the computed release altitude rate is dependent upon the air speed and altitude of the aircraft.

When the altitude rate actually attained by the aircraft 9, and the computed altitude rate to release bomb 11, are equal, as determined by the lift of modified altitude rate cam 120 and modified release altitude rate cam 140, electrical contact is established between the contacts 123 and 148, and an electrical circuit is completed for the relay 251 from battery 291, through switches 225 and 230, leads 292 and 271, contact springs 241 and 242 of micro-switches 166 and 184, contacts 123 and 148, and winding of relay 251, to ground; thus operating relay 251, which locks through its armature 253 and the feather spring 305, to prevent any subsequent separation of the contact 123 and 148 due to a change in the cam lift values, from interfering with the completion of the bomb release solenoid circuit and the proper operation of the bomb release solenoid 303. Relay 251 operates (a) closes a circuit over leads 252 and 255 for the bomb release solenoid 303, which is energized to release the bomb 11 from its shackle; and (b) opens the circuit controlled by armature 254 over lead 259 to extinguish lamp 239 and the reticle light of the sighting instrument, as a visible indication that the bomb run is completed.

The three dimensional cam 140 of the modified release altitude rate cam assembly may be removed and replaced by other and interchangeable cams designed for bombs having different ballistic or range lag characteristics ($B_s$), or for aircraft having different angle of attack characteristics ($\alpha$), or a different depressed line of sight ($\gamma$). The computer mechanism may be compactly housed in a portable unit, so that it may quite readily be removed, or transferred from one aircraft to another, if desired. By providing an aircraft with a series of three-dimensional cams 140 designed for bombs having different ballistic or range lag characteristics, the utility of the aircraft and the efficiency of the apparatus is greatly increased.

ALTERNATIVE SYSTEM

Figure 5:
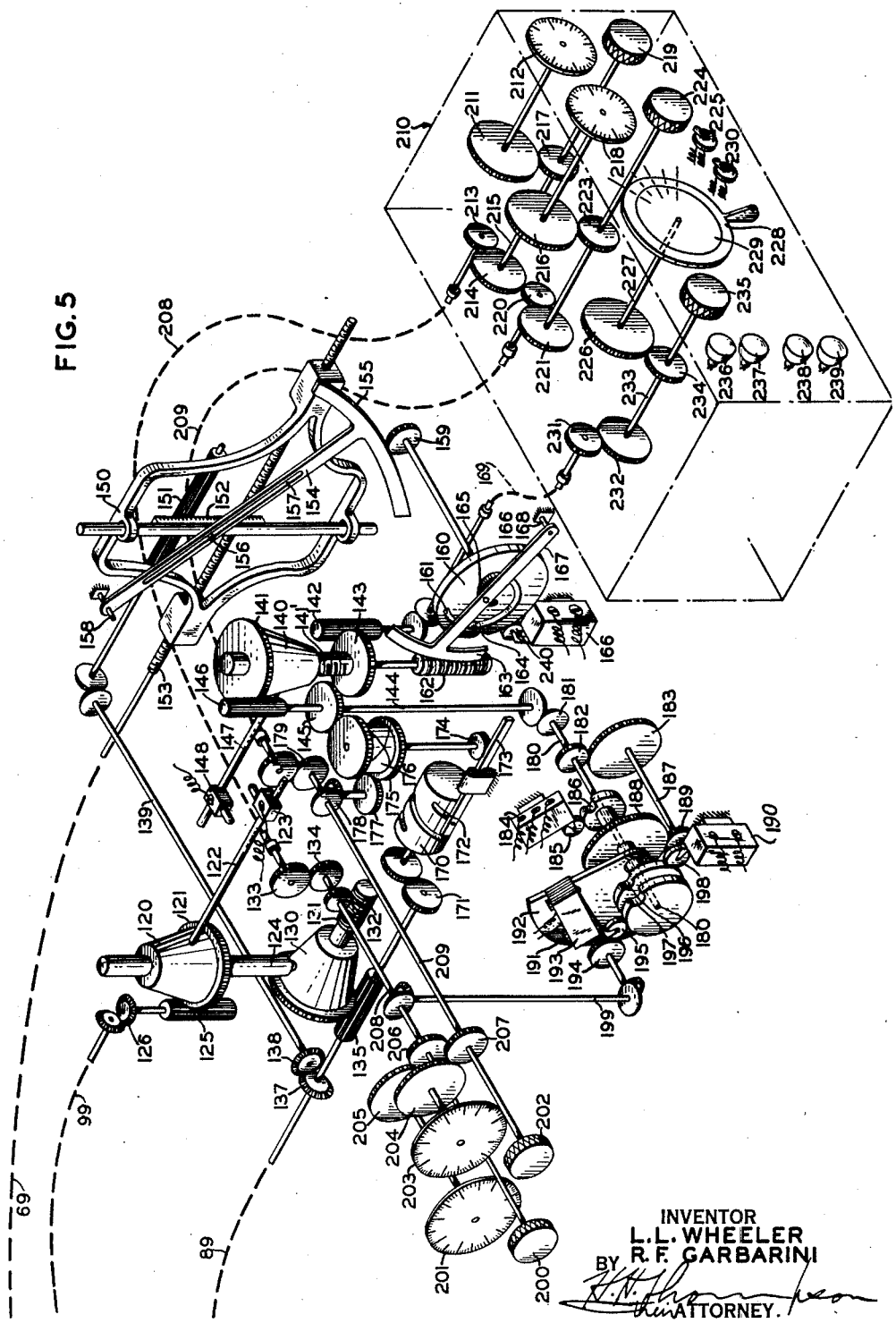
Fig. 5 is a diagram of the computer, and the cockpit control box.

The apparatus shown in Figs. 4 and 5, forming a part of the system previously described, may be replaced by a system in which the correct diving angle for release is computed and compared with the actual diving angle of the aircraft as determined by a vertical gyroscope. An alternative system operating in this manner is shown in Fig. 7. This alternative system is based upon Equations 9 and 11 modified as set forth in Equations 9A and 11A, and upon Equations 1, 12 and 14.

Equation 1 discloses that release altitude ($H_R$) is a function of the true air speed ($V$) of the aircraft, and of the dive angle ($\theta$) of the aircraft with respect to the horizontal. Equation 1 also shows that the dive angle ($\theta_R$) of the aircraft with respect to the horizontal at the moment of release, is a function of actual altitude ($H$), and true air speed ($V$). This relation may be written thus:

$$\theta_R = f'(H, V) \tag{8'}$$

In Equation 8' the angle of attack ($\alpha$) and the range lag ($B_\phi$) are assumed to be equal to zero. The function expressed by Equation 8' may likewise be recorded upon the three dimensional cam 306. This cam 306 is rotated in actual altitude ($H$) by pinion 146 and translated in true air speed ($V$) by sector 163 which may be driven by the same mechanisms described in connection with Figs. 4 and 5. The cam 306 thus lifts its associated cam follower 312 according to release angle ($\theta_R$).

Since Equation 8' does not include the effect of angle of attack ($\alpha$), and the range lag due to air resistance, a computer based on Equation 8' would be inaccurate. When angle of attack ($\alpha$) and range lag ($B_\phi$) are considered, Equation 12 becomes the equation for release, where range lag ($B_\phi$) and angle of attack ($\alpha$) are determined in accordance with Equations 13 and 14. The angle of attack (Equation 14) may be derived from a vector diagram of the forces acting upon the aircraft during flight, and data concerning the ship's lift coefficient.

By solving Equations 12 and 14 and the range lag graph simultaneously using the method of successive approximation, a table can be made which gives the value $(\theta-\alpha)_R$ as a function of actual altitude ($H$) and true air speed ($V$). This table, and the system of equations can be written thus:

$$(\theta-\alpha)_R = F'(V, H) \tag{15'}$$

where the effects of range lag ($B_\phi$) and angle of attack ($\alpha$) are considered.

Computations have shown, that if a cam designed for the function (15') is positioned by modified air speed ($V_M$) and modified altitude ($H_M$), instead of true air speed ($V$) and actual altitude ($H$), the lift would be proportional to $(\theta-\alpha)_R$. This indicates that $(\theta-\alpha)_R$ is the same function of modified air speed ($V_M$) and modified altitude ($H_M$), and can be written thus:

$$(\theta-\alpha)_R = F'(V_M, H_M) \tag{15A'}$$

Compensation for target velocity ($V_T$) and wind velocity ($V_W$) is obtained by rotating shaft 169, pinion 142, and gear 143 of the cam 306 assembly, thus translating the $(\theta-\alpha)_R$ cam 306, in the manner previously described for the modified release altitude rate ($\dot{H}_{MR}$) cam 140.

The shafts 308—308 of the vertical gyroscope 307 are journalled in bearings 313, 314 which are rigidly mounted on the computer casting. The horizontal axis of the bearings 313, 314 is parallel to the pitch axis of the aircraft. With this arrangement, contact disc 309 is continuously positioned according to the diving angle of the aircraft.

*Principle of operation of alternative system*

(1) Before taking off, the estimated pressure at the target ($P_T$) is registered upon the dial 203, by manipulating hand knob 202.

(2) If conditions are favorable to an approach at low altitude, the pilot descends to a predetermined altitude (e.g. 100 feet) above the target, observes the reading of the free air thermometer, and manipulates knob 219 of cockpit control box 210 to introduce the temperature at 100 feet above the target. The pilot also manipulates target pressure knob 224 of cockpit control box 210, until the "coarse" and "fine" target pressure orienting lamps 236 and 237 flash, and remain lighted, to indicate that the correct target pressure ($P_T$) has been introduced into the computer, all of which has been previously described. If conditions are unfavorable to an approach at low altitude, the procedure outlined in step (2) may be omitted.

(3) When the pilot has picked out the target, he levels off the aircraft 9, at any altitude, within the limits of the apparatus, at which he desires to begin the bombing run and remains levelled off long enough to allow the vertical gyroscope to erect itself, in any known manner.

(4) After the gyroscope has been erected, and the erection force removed either manually or automatically, the pilot proceeds to dive while retaining the target in the reticles of his sighting instrument in the manner previously described. The rack of cam follower 312, turns the pinion 311 to rotate the disc 310. When the lift of cam follower 312 matches the value of the angle ($\theta-\alpha$) of the aircraft, the disc contacts 309, 310 complete an electrical circuit for operating relay 251 (Fig. 6) to energize bomb release solenoid 303, and release the bomb 11 from its shackle; and to extinguish the reticle light and lamp 239, in the manner previously described, as a visible indication that the bomb run is completed.

When a vertical gyroscope is employed as a part of the system, the static pressure rate ($\dot{P}_S$) motor 90 and its associated variable speed drive mechanism, static pressure rate ($\dot{P}_S$) shaft 99 and its associated gearing, $\dot{H}_M/\dot{P}_S$ cam 130 and associated gearing, and modified altitude rate ($\dot{H}_M$) cam 120 are all omitted from the system.

The three dimensional cam 306 of the $(\theta-\alpha)_R$ cam assembly may be removed and replaced by other and interchangeable cam designed for bombs having different ballistic or range lag characteristics ($B_\phi$) or for aircraft having different angle of attack characteristics ($\alpha$), or a different depressed line of sight ($\gamma$).

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Computing apparatus for a dive bombsight on an aircraft having a fixed line of sight, an air speed computing means, an altitude computing means, and a rate of descent computing mechanism responsive to each of said means; said altitude computing means comprising a member displaceable according to the logarithmic function of the pressure at a target, a member displaceable according to the logarithmic function of the static pressure at the aircraft, and a subtracting device for displacing an output element according to the difference between the displacements of said members, the displacement of said output element thereby being proportional to the altitude of said aircraft relative to said target.

2. Computing apparatus for a dive bombsight on an aircraft having a fixed line of sight, an air speed computing means, an altitude computing means, and a rate of descent computing mechanism responsive to each of said means; said altitude computing means comprising a device responsive to static pressure at the aircraft, a member displaced by said device according to said static pressure, a logarithmic mechanism operated by said member, a member displaced by said mechanism according to a logarithmic function of said static pressure at the aircraft, a member displaceable according to the logarithmic function of the pressure at the target, a subtracting device operated by said last recited members, and an output element positioned by said subtracting device according to the difference between said logarithmic function of the pressure at the target and the pressure at the aircraft, said output element thereby being positioned according to the altitude of the aircraft with respect to said target.

3. Computing apparatus for an aircraft dive bombsight having means establishing a fixed line of sight comprising craft velocity computing means having an output, craft altitude computing means having an output, release altitude rate computing means responsive to said outputs for computing the rate of descent at which the craft must dive for a bomb released therefrom to strike a target in said fixed line of sight, actual altitude rate computing means for computing the actual craft rate of descent, and means for comparing said release altitude rate with said actual altitude rate for initiating the bomb release operation upon their correspondence.

4. Computing apparatus for an aircraft dive bombsight having means establishing a fixed line of sight, comprising a craft static pressure responsive device, a device responsive to both static and dynamic pressures at the aircraft, means actuated by said latter device for computing craft velocity, means actuated by said static pressure device for computing craft altitude, a release altitude rate computing mechanism controlled by the velocity and altitude computing means for continuously computing the rate of descent at which said aircraft must dive for a bomb released therefrom to strike a target in said line of sight, means computing actual altitude rate of the craft for continuously computing the actual rate of descent, and means for comparing said actual rate with said release altitude rate to thereby initiate the bomb release operation upon their correspondence.

5. Computing apparatus for a dive bombsight on an aircraft having means establishing a fixed line of sight, comprising means responsive to craft velocity, means responsive to craft altitude, a release altitude rate computing mechanism responsive to both said means for continuously computing the diving angle at which said aircraft must be disposed for a bomb released therefrom to strike a target on said line of sight, means responsive to actual craft diving angle of said aircraft, and a release mechanism comparing said computed diving angle with said actual diving angle to initiate the bomb release operation upon their coincidence.

6. Computing apparatus for a dive bombsight having a fixed line of sight on an aircraft, comprising a motion producing device responsive to static pressure of the craft, a motion producing device responsive to both static and dynamic pressures of the craft, means responsive to said latter device for computing craft velocity, means actuated by said static pressure device for computing craft altitude, a computing mechanism actuated by each of said means for continuously computing a measure of the diving angle at which said aircraft must be disposed for a bomb released therefrom to strike a target in said line of sight, means responsive to the time rate of change of craft static pressure, means responsive to the last recited means for computing the actual diving angle of said aircraft in response to the time rate of change of craft static pressure and craft static pressure, and means for indicating when the computed diving angle of said actual diving angle coincide.

7. Computing apparatus for a dive bombsight having a fixed line of sight on an aircraft, comprising, in combination, a first member displaceable in accordance with the altitude of the craft relative to the target, a second member displaceable in accordance with craft velocity, a positionable element, mechanism actuated by said first and second members for position said element according to the release altitude rate at which said aircraft must dive to strike a target in said line of sight, an element positionable according to the actual altitude rate at which the craft is descending, and means operated when the positions of said elements coincide for initiating bomb release operations.

8. In combination with a dive bombsight having a fixed line of sight with respect to the thrust axis of a bombardment aircraft, appartus for automatically determining the correct release altitude rate for releasing a bomb from the aircraft to strike a target on said line of sight, comprising a displacement device responsive to static pressure at the aircraft, a displacement device responsive to both the dynamic and static pressures at the aircraft, an altitude mechanism settable according to the static pressure at the target and operated by said static pressure device for continuously computing the altitude of the aircraft above the target, and computing means operated by said mechanism and each of said devices for coordinating the rate of change of altitude and the craft velocity.

9. In combination with a dive bombsight having a fixed line of sight with respect to the thrust axis of a bombardment aircraft, apparatus for automatically determining the correct release altitude rate for releasing a bomb from the aircraft to strike a target in said line of sight, comprising a torque producing device responsive to static pressure at the aircraft, a torque producing device responsive to both the static and dynamic pressures at the aircraft, and a first computing mechanism operated by both of said devices for automatically computing the correct release altitude rate for releasing the bomb, said correct release altitude rate being dependent upon the velocity and diving angle of the aircraft for any fixed line of sight, second means computing the time rate of change of static pressure, a third computing means operated by said static pressure device and said time rate of change of static pressure means having an output responsive to actual craft altitude rate, and contact means responsive to said first and third computing means, and a mechanism for initiating the bomb release operation when the actual altitude rate equals the release altitude rate.

References Cited in the file of this patent

UNITED STATES PATENTS

| Re. 20,263 | Urfer | Feb. 9, 1937 |
|---|---|---|
| 1,506,192 | Meijer | Aug. 26, 1924 |
| 1,940,518 | Watson et al. | Dec. 19, 1933 |
| 2,065,303 | Chafee et al. | Dec. 22, 1936 |
| 2,165,744 | Boettinger | July 11, 1937 |
| 2,140,765 | Reutter | Dec. 20, 1938 |
| 2,152,635 | Crane et al. | Apr. 4, 1939 |
| 2,161,081 | Ovtschimmikoff | June 6, 1939 |
| 2,185,578 | Beardsley | Jan. 2, 1940 |
| 2,191,250 | Fischel | Feb. 20, 1940 |
| 2,194,141 | Estoppey | Mar. 19, 1940 |
| 2,295,616 | Williamson | Sept. 15, 1942 |
| 2,309,400 | Kollsman | Jan. 26, 1943 |
| 2,334,885 | Roudnicky | Nov. 23, 1943 |
| 2,347,134 | Sidwell | Apr. 18, 1944 |
| 2,357,060 | Robinson | Aug. 29, 1944 |
| 2,369,788 | Luck | Feb. 20, 1945 |
| 2,371,606 | Chafee et al. | Mar. 20, 1945 |
| 2,404,746 | Rylsky et al. | July 23, 1946 |
| 2,409,648 | Van Auken et al. | Oct. 22, 1946 |
| 2,410,058 | Frische et al. | Oct. 29, 1946 |
| 2,410,097 | Morgenthaler et al. | Oct. 29, 1946 |
| 2,410,468 | Van Auken et al. | Nov. 5, 1946 |
| 2,516,290 | Barth | July 25, 1950 |
| 2,529,324 | Blackett et al. | Nov. 7, 1950 |
| 2,534,397 | Barth | Dec. 15, 1950 |